United States Patent
Bader et al.

(10) Patent No.: US 8,006,585 B2
(45) Date of Patent: Aug. 30, 2011

(54) ACTUATING CYLINDER FOR VEHICLE GEARBOXES

(75) Inventors: Josef Bader, Friedrichshafen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 932 days.

(21) Appl. No.: 11/915,872

(22) PCT Filed: Jun. 7, 2006

(86) PCT No.: PCT/EP2006/005416
§ 371 (c)(1),
(2), (4) Date: Nov. 29, 2007

(87) PCT Pub. No.: WO2006/131331
PCT Pub. Date: Dec. 14, 2006

(65) Prior Publication Data
US 2009/0308193 A1  Dec. 17, 2009

(30) Foreign Application Priority Data
Jun. 9, 2005 (DE) .......................... 10 2005 026 475

(51) Int. Cl.
*B60K 17/10* (2006.01)
*F01B 7/20* (2006.01)
(52) U.S. Cl. ........................ 74/473.11; 92/51
(58) Field of Classification Search .................. 74/473.1, 74/473.11, 473.36, 335; 92/13.4, 13.41, 92/169.1, 171.1, 18, 51; 384/32
See application file for complete search history.

(56) References Cited

U.S. PATENT DOCUMENTS

| 787,479 | A | * | 4/1905 | Tanner ............................... 92/62 |
| 924,350 | A | * | 6/1909 | Hibsohle .......................... 91/234 |
| 3,713,364 | A | * | 1/1973 | Francia .......................... 92/13.1 |
| 4,593,606 | A | * | 6/1986 | Klatt et al. ......................... 92/52 |
| 4,773,300 | A | * | 9/1988 | Klatt et al. ....................... 91/169 |
| 5,012,725 | A | * | 5/1991 | Leary ................................. 92/63 |
| 5,165,322 | A | * | 11/1992 | Moody .............................. 92/65 |
| 6,408,740 | B1 | * | 6/2002 | Holt et al. ........................ 92/13.1 |
| 6,463,996 | B1 | * | 10/2002 | Streubel et al. ................ 164/441 |
| 6,484,600 | B1 | * | 11/2002 | Bennett et al. ............. 74/473.11 |
| 2003/0099735 | A1 | * | 5/2003 | Yu ................................. 425/145 |
| 2006/0283275 | A1 | | 12/2006 | Bader |
| 2007/0137336 | A1 | * | 6/2007 | Burk et al. ....................... 74/335 |

FOREIGN PATENT DOCUMENTS

| DE | 945 609 | 2/1954 |
| DE | 1 155 348 | 10/1963 |
| DE | 31 10 855 A1 | 10/1982 |

(Continued)

*Primary Examiner* — Thomas R Hannon
*Assistant Examiner* — Phillip A Johnson
(74) *Attorney, Agent, or Firm* — Davis & Bujold, P.L.L.C.

(57) ABSTRACT

A vehicle transmission having a housing (5) with a region in which a connection plate (7) can be firmly attached. The connection plate includes areas for receiving at least parts of the actuating elements, which actuate the torque-transmitting components, and/or parts of the actuating elements, which actuate a transmission shifting device. At least one required actuating cylinder (3) is formed by a first cylinder part, that is located within the connection plate, and a second cylinder part, that is located within the transmission housing. A stop ring (10), provided in the cylinder (3), is configured in such a way that the sealing contact surfaces of a piston (2), in the transmission housing and/or the connection plate, are formed by a bushing-shaped expansion (10', 10") of the stop ring (10).

8 Claims, 2 Drawing Sheets

Fig.

FOREIGN PATENT DOCUMENTS

| | | | |
|---|---|---|---|
| DE | 3702911 A1 * | 8/1988 | |
| DE | 44 22 900 A1 | 11/1994 | |
| DE | 103 47 493 A1 | 5/2005 | |
| EP | 1 247 031 B1 | 5/2003 | |
| GB | 888036 | 1/1962 | |

* cited by examiner

ACTUATING CYLINDER FOR VEHICLE GEARBOXES

This application is a national stage completion of PCT/EP2006/005416 filed Jun. 7, 2006, which claims priority from German Application Serial No. 10 2005 026 475.1 filed Jun. 9, 2005.

FIELD OF THE INVENTION

The invention relates to a vehicle transmission.

BACKGROUND OF THE INVENTION

Vehicle transmissions today comprise a plurality of components that correspond to different functions, which makes the design of transmissions elaborate and expensive, particularly when actuators to activate shifting elements must be integrated in or on the transmission, as is the case in automatic transmissions.

A vehicle transmission is known from the Applicants DE 44 22 900 A1 which comprises a connection plate attached to the transmission housing. The plate is arranged in an area of the housing that extends toward a clutch mechanism, with parts of a gear brake arranged in the connection plate.

In addition, a vehicle gearbox is known from the Applicants DE 103 47 493 A1 in which a connection plate is also provided in which accommodations for at least parts of the actuating elements for actuating the torque-transmitting components are provided. Here, the pneumatic actuating cylinder for a shift device of the gearbox comprises a first cylinder part that is provided in the connection plate and a second cylinder part that is provided in the gearbox housing. A piston is displaceably arranged in the actuating cylinder, the piston having a functional connection with a shift rod of the gearbox. In this design, a stop ring is provided in the cylinder, the stop ring preventing further displacement of the piston, which is displaceably arranged in the cylinder, to positions that do not correspond to any cylinder position.

With this design, it has proven disadvantageous that the configuration of the sealing contact surfaces of the piston inside the transmission housing results in casting difficulties.

It is the object of the present invention to provide a vehicle transmission in which the transmission comprises a region in which a connection plate is provided that can be firmly connected to the housing, the connection plate having receiving areas for at least parts of the actuating elements for actuating the torque-transmitting components and/or parts of the actuating elements for actuating the shifting elements of the transmission, where the demands on the surface quality of the housing and the connection plate are reduced, compared to the design known from DE 103 47 493 A1.

SUMMARY OF THE INVENTION

Accordingly, a vehicle transmission is proposed in which the housing comprises a region in which a provided connection plate is firmly attached to the housing; the connection plate comprising accommodations for at least parts of the actuating elements, which actuate the torque-transmitting components and/or parts of the actuating elements, which actuate the shift device of the transmission, where the at least one required actuating cylinder is formed by a first cylinder part that is provided in the connection plate and by a second cylinder part that is provided in the transmission housing, and the stop ring provided inside the cylinder is configured such that the sealing contact surfaces of the piston in the transmission housing and/or in the connection plate are formed by a bushing-shaped expansion of the stop ring.

By way of the inventive expansion of the stop ring around the sealing contact surface, it is possible to reduce the demands on the surface quality of the housing and the connection plate, whereby the manufacture of the stop ring is not problematic in terms of casting technique. In addition, the costs of waste from manufacturing errors are considerably reduced.

BRIEF DESCRIPTION OF THE DRAWINGS

The invention will now be described, by way of example, with reference to the accompanying drawings in which.

DETAILED DESCRIPTION OF THE INVENTION

Figure 1:
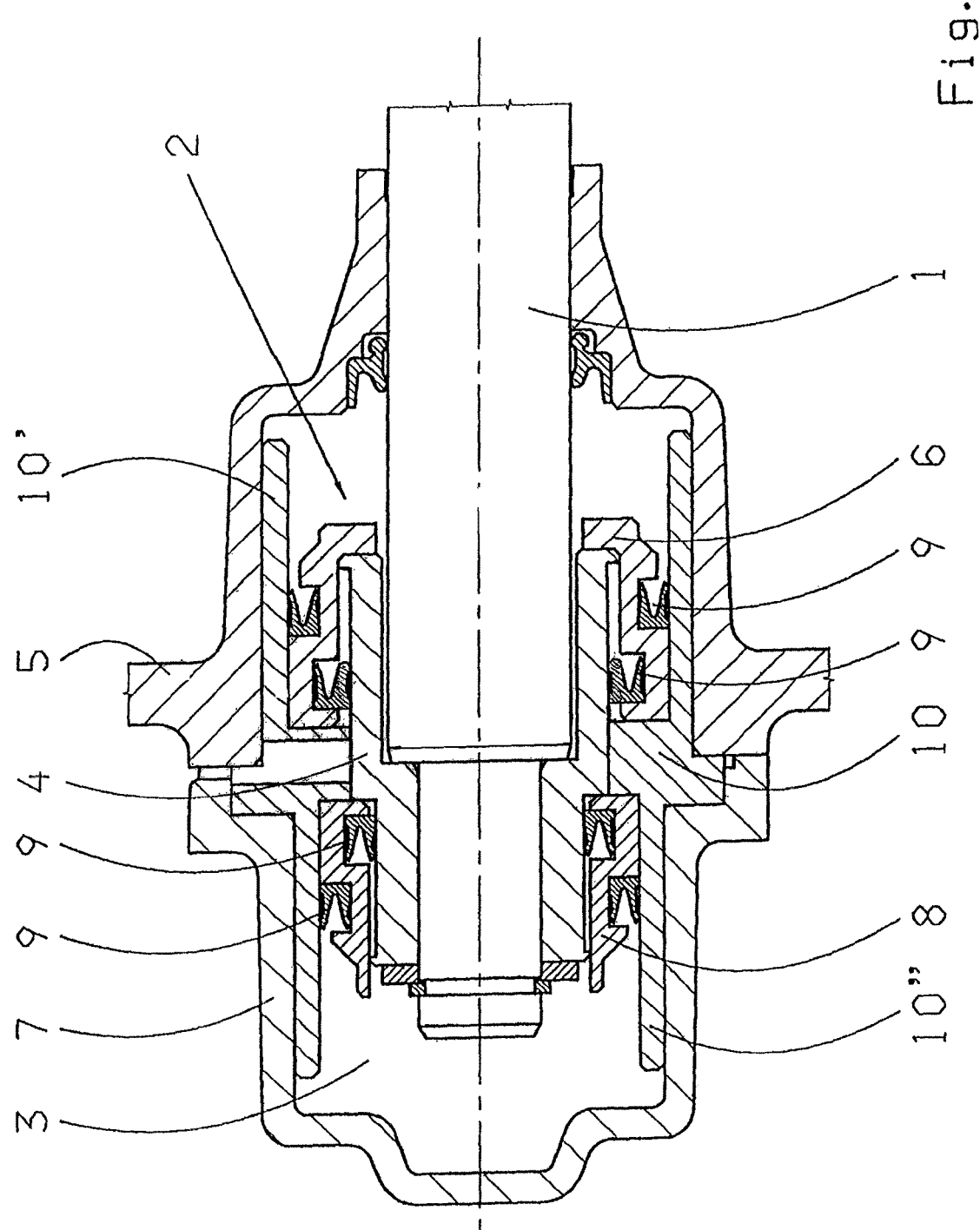
FIG. 1 is a schematic sectional view of a first embodiment of a part of the inventive transmission relevant to the invention.
Figure 2:
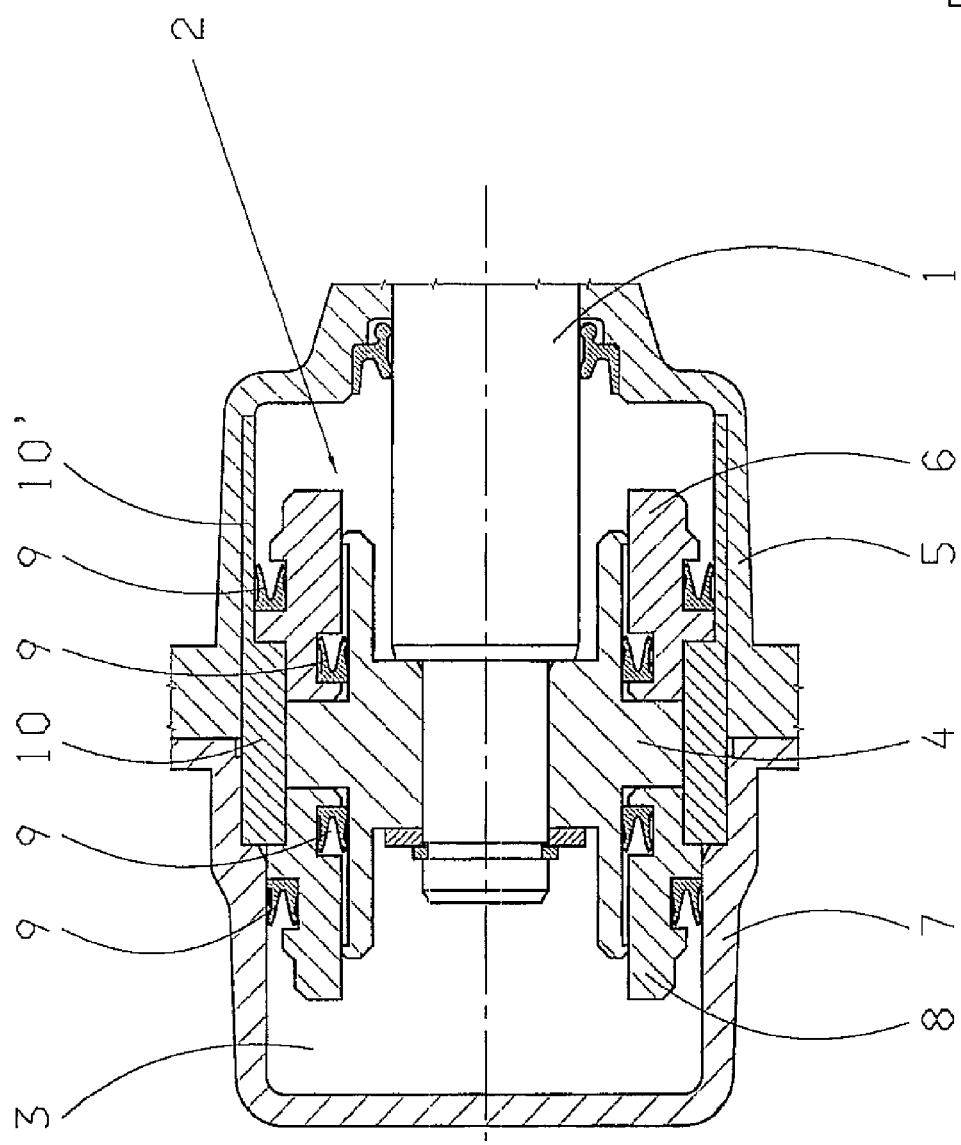
FIG. 2 is a schematic sectional view of a further embodiment of a part of the inventive transmission that is relevant to the invention.

In the FIGS. 1 and 2, the reference numeral 1 denotes a transmission shift rod that is connected to a piston 2; the piston 2 comprises an interior bushing 4 and a first piston part 6 that is displaceably arranged in a transmission housing 5, as well as a second piston part 8 that is displaceably arranged in a connection plate 7, wherein the piston parts 6 and 8 comprise required sealing rings 9.

As is apparent from FIGS. 1 and 2, the piston 2 is disposed in an axially displaceable manner inside a cylinder 3 that is configured as an actuating cylinder for the shift rod 1, wherein one part of the cylinder 3 is formed by the transmission housing 5 and one part of the cylinder 3 by the connection plate 7, and wherein a stop ring 10 is provided inside the cylinder 3. The cylinder 3 is preferably configured as a three-position cylinder and can be a pneumatic or hydraulic cylinder. When both piston parts 6, 8 rest against the stop ring 10, this corresponds to a neutral position.

According to the invention, the stop ring 10 is configured in such a way that the sealing contact surfaces of the piston 2 in the transmission housing 5 and/or in the connection plate 7 are formed by a bushing-shaped expansion 10' or, as the case may be, 10" of the stop ring 10.

FIG. 1 depicts the embodiment in which the sealing contact surfaces of the piston 2 are formed in both the transmission housing 5 and in the connection plate 7 by a bushing-shaped expansion 10', or, as the case may be, 10" of the stop ring 10.

The subject matter of FIG. 2 is the embodiment in which the sealing contact surface of the piston 2 in the transmission housing 5 is formed by the expansion 10' or the stop ring 10.

Any design embodiment, in particular any spatial configuration of the components of the inventive transmission, in particular the cylinder and the piston that is displaceably arranged in the cylinder, as such or in relation to each other, and as far as is technically meaningful, falls under the scope of protection of the present claims, without influencing the function of the transmission as it is described in the claims, even when these designs are not explicitly presented in the Figures or the description.

REFERENCE NUMERALS 1 shift rod
2 piston
3 cylinder 4 interior bushing
5 transmission housing
6 piston part
7 connection plate
8 piston part
9 sealing ring
10 stop ring
10' bushing-shaped expansion of the stop ring
10" bushing-shaped expansion of the stop ring

The invention claimed is:

1. A vehicle transmission comprises:
a housing with a region to which a connection plate is firmly attached, the connection plate having receiving areas for at least parts of actuating elements that actuate at least one of a torque-transmitting component and a shift device of the transmission, at least one required actuating cylinder being formed of a first cylinder part that is provided in the connection plate and a second cylinder part that is provided in a transmission housing, a stop ring (10) being located in the actuating cylinder (3) and configured such that sealing contact surfaces of a piston (2) being formed by a bushing-shaped expansion (10', 10") of the stop ring (10) in only one of the transmission housing (5) and the connection plate (7).

2. The vehicle transmission according to claim 1, wherein the cylinder (3) is a three-position cylinder.

3. The vehicle transmission according to claim 1, wherein the cylinder (3) is one of a pneumatic cylinder and a hydraulic cylinder.

4. A vehicle transmission actuating cylinder comprising:
a first cylinder portion being defined by a connection plate (7), the connection plate (7) accommodating at least a portion of an actuating element for actuating at least one of a torque transmitting component and a transmission shift device;
a second cylinder portion being defined by a transmission housing (5), the connection plate (7) being connected to the transmission housing (5) and the connection plate (7) and the transmission housing (5) together defining the actuating cylinder (3);
a stop ring (10) being located within the actuating cylinder (3) integral with a first bushing-shaped expansion (10') which extends into one of the first cylinder portion and the second cylinder portion;
a piston (2) having a first surface communicating with the first bushing-shaped expansion (10') for forming a first sealing contact surface;
a second bushing-shaped expansion (10") is integral with the stop ring (10) and extends into another of the first cylinder portion and the second cylinder portion;
a second surface of the piston (2) communicates with the second bushing-shaped expansion (10") for forming a second sealing contact surface; and
the actuating element comprises a shift rod (1) which extends axially through the transmission housing (5) into the actuating cylinder (3), the actuating element is fixed to and biased by an interior bushing (4) of the piston (2), and the interior bushing (4) is sealably coupled to both the first bushing-shaped expansion (10') and the second bushing-shaped expansion (10").

5. The vehicle transmission according to claim 4, wherein the cylinder (3) is a three-position cylinder.

6. The vehicle transmission according to claim 4, wherein the cylinder (3) is one of a pneumatic cylinder and a hydraulic cylinder.

7. A vehicle transmission actuating cylinder comprising:
a first cylinder portion being defined by a connection plate (7), the connection plate (7) accommodating at least a portion of an actuating element for actuating at least one of a torque transmitting component and a transmission shift device;
a second cylinder portion being defined by a transmission housing (5), the connection plate (7) being connected to the transmission housing (5) and the connection plate (7) and the transmission housing (5) together defining the actuating cylinder (3),
a stop ring (10) being located within the actuating cylinder (3) integral with a first bushing-shaped expansion (10') which extends into one of the first cylinder portion and the second cylinder portion;
a piston (2) having a first surface communicating with the first bushing-shaped expansion (10') for forming a first sealing contact surface;
a second bushing-shaped expansion (10") is integral with the stop ring (10) and extends into another of the first cylinder portion and the second cylinder portion;
a second surface of the piston (2) communicates with the second bushing-shaped expansion (10") for forming a second sealing contact surface;
the stop ring (10) is located within the actuating cylinder (3) at the connection of the transmission housing (5) and the connection plate (7); and
the actuating element comprises a shift rod (1) which extends axially through the transmission housing (5) into the actuating cylinder (3), the actuating element is fixed to and biased by an interior bushing (4) of the piston (2), and the interior bushing (4) is sealably coupled to both the first bushing-shaped expansion (10') and the second bushing-shaped expansion (10").

8. The vehicle transmission actuating cylinder according to claim 7, wherein the piston (2) is one of pneumatically and hydraulically axially biased between three positions and each of the first sealing contact surface and the second sealing contact surface comprise a sealing ring (9).

* * * * *